United States Patent

[11] 3,578,049

| [72] | Inventor | Ernst Weichel<br>Bahnhofstr.1, Heiningen, Kreis,<br>Goppingen, Germany |
|---|---|---|
| [21] | Appl. No. | 708,244 |
| [22] | Filed | Feb. 26, 1968 |
| [45] | Patented | May 11, 1971 |

[54] MEANS FOR COMMINUTING STALK OR LEAF VEGETABLE
19 Claims, 6 Drawing Figs.

[52] U.S. Cl. ...................................................... 146/98,
146/117, 56/345, 56/364
[51] Int. Cl. ...................................................... A01d 55/00,
B02c 18/06
[50] Field of Search........................................... 146/98,
122, 117, 107 (T), 119 (Inquired), 106
(Inquired); 56/364, 345

[56] References Cited
FOREIGN PATENTS

| 1,928,784 | Germany...................... | 146/98 |
| 1,932,424 | Germany...................... | 146/98 |

*Primary Examiner*—Willie G. Abercrombie
*Attorney*—McGlew and Toren

ABSTRACT: A comminuting arrangement for the cutting or crushing of stalk or leaf vegetables has a conveyor and a conveyor chute forming the discharge of the conveyor and comprising walls in the zone of a cutting device. The cutting device comprises at least two groups of cutting discs, and the discs of each group are arranged on a respective common shaft. The shafts carrying the cutting discs are mounted exteriorly of the conveying chute and rotate at a low speed. The distance between the two shafts arranged in opposition to each other is less than the sum of the radii of the opposed cutting discs, and the cutting discs extend through opposite walls of the chute and only partially into the chute. The device is arranged for mounting on a self-loading vehicle or for stationary operation.

INVENTOR
ERNST WEICHEL

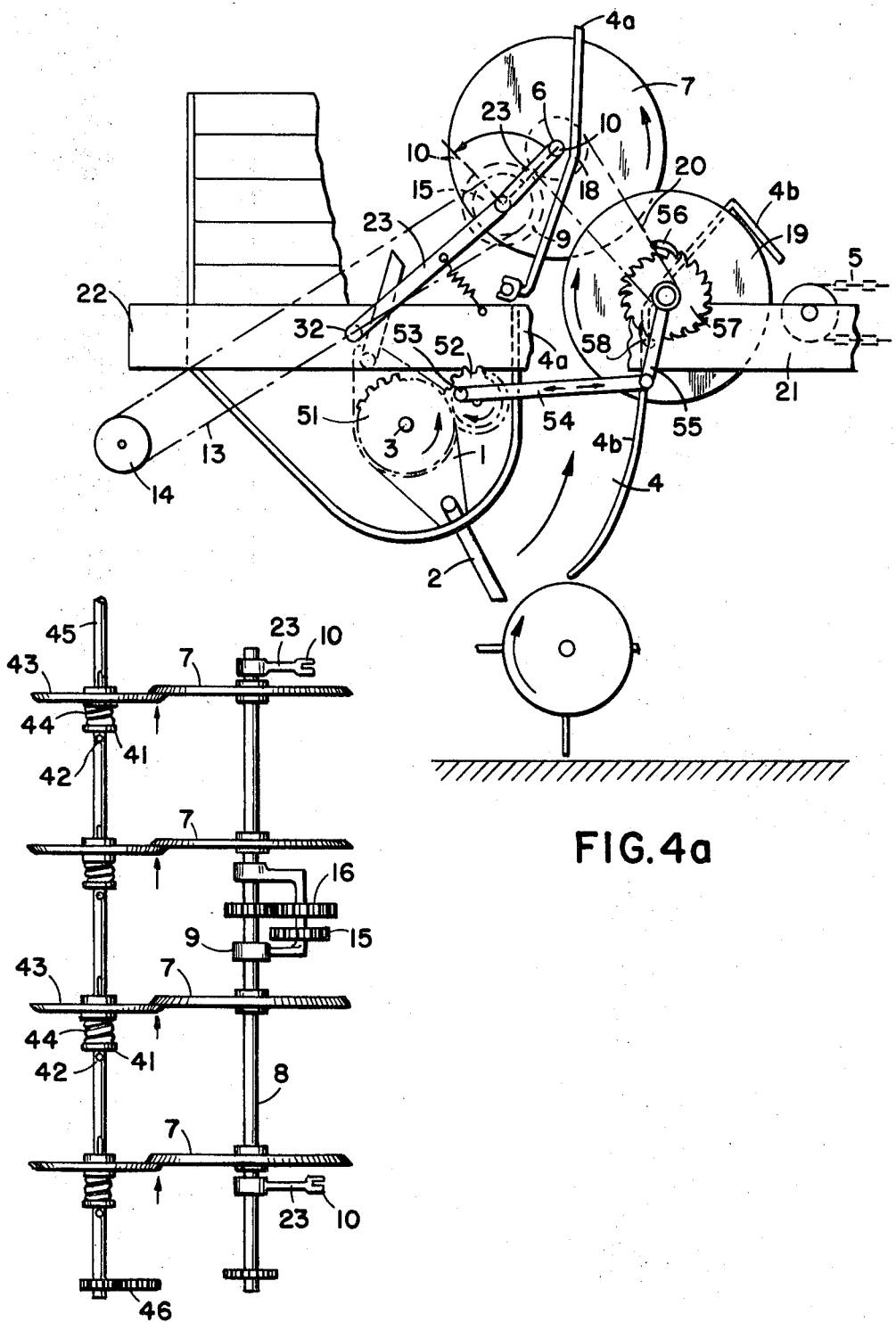

MEANS FOR COMMINUTING STALK OR LEAF VEGETABLE

BACKGROUND OF THE INVENTION

Means, including a conveyor and a conveying chute, for comminuting stalk or leaf vegetables are known. These include a number of wall or panel parts in the path of travel of the conveyor conduit and in the zone of a cutting device. The cutting device comprises at least two groups of cutting discs, with the discs of each group being mounted on a respective shaft for rotation. Various forms of cutting devices are known.

However, known cutting devices have a number of disadvantages. For example, the entire cutting device is mounted in the path of a conveying chute, so that the effective cross section of the chute is reduced by the shafts carrying the cutting discs and to such an extent that the material to be conveyed is practically prevented from passing this point in the chute. In another known apparatus, the rotating discs are suspended on arms, but this requires an economically unacceptable amount of space. A further common feature of known devices is that, for all practical purposes, they form a part of a loading vehicle and cannot be used as an independent stationary unit.

SUMMARY OF THE INVENTION

This invention relates to comminuting means for cutting or crushing stalk or leaf vegetables, of the type including a conveyor, a conveying chute, and a cutting device. More particularly, the invention relates to an improved construction and arrangement of the cutting device, which can either be mounted on a loading vehicle or be positioned stationary on the ground or the like.

The objective of the invention is to avoid the disadvantages of prior art devices and to provide a cutting device which, in every case, insures a clean cut in the material to be transported and unimpeded passage of the material, despite having a low power consumption. The arrangement of the present invention provides a cutting device in association with a conveyor and a conveyor chute, and in which the conveyor chute, at least, comprises a number of wall or panel parts in the zone of the cutting device. The cutting device consists of at least two groups of cutting discs, with the discs of each group being mounted on a respective common shaft for rotation.

The shafts carrying the cutting discs are mounted exteriorly of the conveying chute, and rotate at a low speed. The distance between the two shafts is smaller than the sum of the radii of opposed cutting discs, and the cutting discs extend through opposite panel parts or walls of the chute or conveying conduit, and project only partially thereinto. The invention arrangement thus assures that the cross section available for transported material suffers substantially no reduction because the only parts of the cutting device which extend into the chute are those which effect the cutting action. Also, the drive parts of the cutting device are isolated from the material to be conveyed, so that failures and breakdowns due to stalks winding around the drive parts are practically eliminated. The material to be conveyed can be fed to the cutting device either in a loose state or in a compressed state without giving rise to obstruction. A further advantage is that the arrangement of the invention can be detached from a loading vehicle easily and used as an independent stationary unit.

The cutting device may be so arranged that opposite cutting discs, in their zone of overlap, almost contact one another, thereby insuring a particularly clean cut. Furthermore, by rotating opposite cutting discs in the same angular direction, so that the direction of motion in the zone of overlap is the same with both loops of cutting devices, the direction of rotation can be arranged to point in the direction in which the material is conveyed, thus contributing to a smooth and even transport.

In some cases, it is advantageous for the opposite cutting discs to be of different diameters. A particularly effective arrangement is attained by associating, with each cutting disc on one shaft, a pair of discs on the other shaft, in such a way that each single disc extends, in the zone of overlap, between a pair of discs on the other shaft. The distance between the two discs of a pair is preferably made just sufficient to accommodate the thickness of the opposing individual disc. An arrangement of this type provides for particularly satisfactory cuts being obtained, as bending or crushing of the individual stalks is practically impossible.

The drive of the cutting device can be so designed that only one group of discs is driven, with the other group being freely rotatable so that it can freely rotate under the action of frictional forces.

The driving of the device may be intermittent, and thus easily adaptable to the generally intermittent action by which the material is conveyed. This enables the cutting device to be so operated that the maximum power need is always such that other parts of the plant, as a whole, and which are fed from the same power source, will be drawing a minimum power at the time the cutting device is drawing power. Such coordination is particularly advantageous when the cutting device is used with a loading vehicle, for example, because the amount of power required at a certain moment determines the size of the tractor vehicle supplying the power, and the invention arrangement thus enables the peak power to be considerably reduced.

The respective shafts of the groups of discs preferably are mounted on rockers so that the discs can be moved out of the chute if not needed. It is also possible to spring bias the discs to project only a slight distance into the chute, so that they exert only a slight action and serve as a supplementary conveying device on the material to be transported. In an arrangement of this type, the freely rotating cutting discs can also be utilized as a holding device preventing the material to be conveyed from sliding back during the interval between separate transport strokes. The cutting discs can be equipped, in a known manner, with a flyback suppressor preventing reverse rotation of the cutting discs.

The rockers carrying the shafts of the cutting discs can also be oscillated by a reciprocating drive means, so that the cutting discs in those phases of the movement which require less power, can extend into the conveying conduit to a greater depth, thereby contributing further to the evenness of the energy and power requirements.

Advantageously, one of the respective shafts supporting the cutting discs is equipped with a manual operating device such as a crank, and this makes possible, after completion of the conveying operation, the removal, with great ease, of the residual material present in the conduit or chute and without raising any need to climb onto the loading platform on the vehicle.

The cutting device can be so constructed that at least one of the respective shafts carrying the cutting discs is subdivided, with the parts being slightly inclined relative to each other so that the central cutting blades are in a vertical plane while the outer cutting blades or discs are in a plane at a small angle to the vertical. With this arrangement, it is assured that frictional resistance within the cutting device, in the transport direction, will not increase and may even decrease.

The cutting device is preferably so constructed that it constitutes a unit so that, if it is not to be used in conjunction with the loading vehicle, it can be removed, as a unit, and be placed on a stand with only a relatively few manipulations, after which it can be operated as a stationary cutting or unloading device. If the device is used on a loading vehicle, it is advantageous for one of the shafts to be mounted on a level with the loading platform of the vehicle, so that transfer of the material from the conveying and cutting device to the loading vehicle will proceed reliably without local accumulations. In such case, the return pulley of the scraper floor of the loading vehicle is so arranged that it does not result in any narrowing of the chute and provides sufficient space for the cutting device.

The cutting device of the invention is very useful not only with green material to be conveyed, such as grass, beet leaves, green maize, but also in the case of dry material, such as hay or straw. With difficult substances, such as wilted grass, wilted silage, moist straw, and other tough material, the power requirement will, in some cases, increase noticeably if a reasonable operating speed is still to be obtained. In such cases, occasional obstructions occur because the device is no longer cutting all the material satisfactory. For perfect results under such circumstances, it is advisable for the groups of cutting discs to be driven at respective different peripheral velocities, so that undesirable temporary crushing and jamming of tufts of material between the discs, with a resulting increase of the power absorbed, will be avoided. This is due to the discs rotating at the greater peripheral speed, owing to a considerable relative movement with respect to the slower discs, will saw through the material rather than cutting it, and because the slower disc slowly and steadily feeds the material to the disc rotating at a higher speed. Even though the material fed to the discs is taken in by the discs in the direction of the point of overlap, since there is a considerable relative movement between the material and the slower disc, on the one hand, and between the material and the faster disc, on the other hand, sudden intermittent crushing of the substance being processed no longer occurs. It has been found that a very clean cut, extremely economical of power even when the cutting edges are not entirely sharp, occurs particularly when the cutting discs are given a plane cylindrical grinding, which insures that the numerous tiny points of the cutting discs cut into even very tough stalks with very great ease, and then cut through them.

In this connection, it is advantageous to have a type of drive in which the peripheral speed of one group of cutting discs is a multiple of that of the other, and particularly good results are obtained when the peripheral speed of one group is five to six times that of the other group.

With many kinds of material, it is not only necessary but even a disadvantage if the discs are arranged in such a manner that one disc extends between the discs of a pair of the opposite discs. The interaction of two single discs is sufficient to provide excellent results, and the results can be improved if one disc is axially displaceable, within limits, on a shaft, but secured against rotation relative to its shafts, in such a way that it can be automatically biased against the opposite discs which are fixed against axial displacement on its shaft. Not only can the cutting quality be even further increased, but inevitable production tolerances can be accommodated without difficulty.

An advantage of the invention arrangement is that, during an unloading process, the cutting discs function as auxiliary conveying means enabling the conveying conduit to be completely emptied even when the path of movement of the conveying devices in the conveying conduit does not extend quite to the exit of the latter. The residual material in the conduit is completely removed from the latter by friction against the sides and the outer surfaces of the cutting discs, if the conveying and cutting apparatus is activated for a short space of time.

If the material to be conveyed is to be loaded uncut, for example, then one shaft, carrying the larger cutting discs, can be swung out of the conduit while that carrying the smaller cutting discs, which extend only a comparatively short distance into the conduit, can be rotated slowly and thus assist the action of conveying the material upwardly without any appreciable comminution of the material, due to the absence of a counterdisc. As the material resting on the discs moves upwardly, even in the intervals between the transport strokes of the conveying prongs, the material can no longer rise and drop periodically so that tilting of the chassis during loading is avoided. The operation can also be carried out with the small cutting discs not being driven and merely rotating to follow the movement of the material, during loading without cutting, and a reverse rotation can be prevented by a known ratchet mechanism. This enables a sensitive substance to be loaded without being damaged, and avoids tilting of the vehicle.

The cutting device can also be so arranged that, in loading without cutting, the discs are driven temporarily by a stepping device in accordance with the action of the conveying device so that they are stepped through a predetermined angle and only in the intervals between transport strokes, to press the material upwardly to some extent or to prevent if from dropping back. This improves the uniformity of the power requirements of the machine.

Either plane or sawtooth blades can be used, and it is possible for the cutting device to be constructed as an easily detachable unit. The drive may be of any desired type, and power transmission may be effected by either belts or chains.

An object of the invention is to provide a cutting device for agricultural material which insures a clean cut in the material to be transported and unimpeded passage of the material through a conveying chute while requiring only a small amount of power.

Another object of the invention is to provide such a cutting device comprising two groups of cutting discs with each group being rotatable on a respective common shaft.

A further object of the invention is to provide such a cutting device in which the shafts are mounted outside the conveying chute.

Still another object of the invention is to provide such a cutting device in which the shafts are rotated at a low speed.

A further object of the invention is to provide such a cutting device in which the distance between the two shafts is smaller than the sum of the radii of opposite cutting discs.

Yet, another object of the invention is to provide such a cutting device in which the cutting discs extend through opposite panel parts or walls of the conveying conduit and extend only partially into the conveying conduit.

BRIEF DESCRIPTION OF THE DRAWINGS

For an understanding of the principles of the invention, reference is made to the following description of typical embodiments thereof as illustrated in the accompanying drawings.

IN THE DRAWINGS

Figure 1:
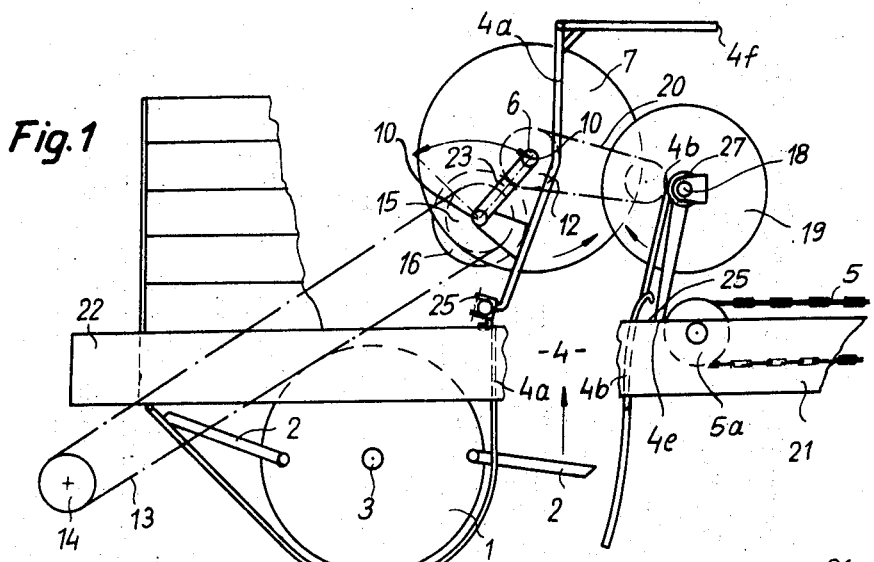
Figure 2:
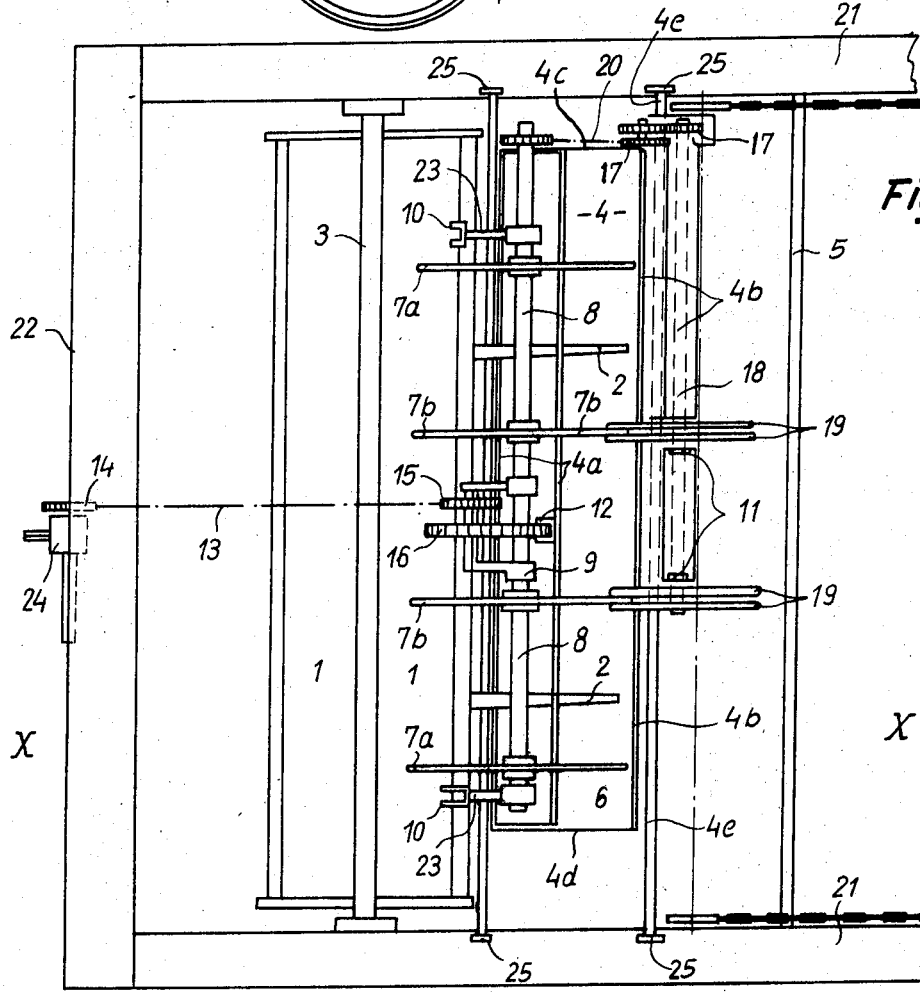
Figure 3:
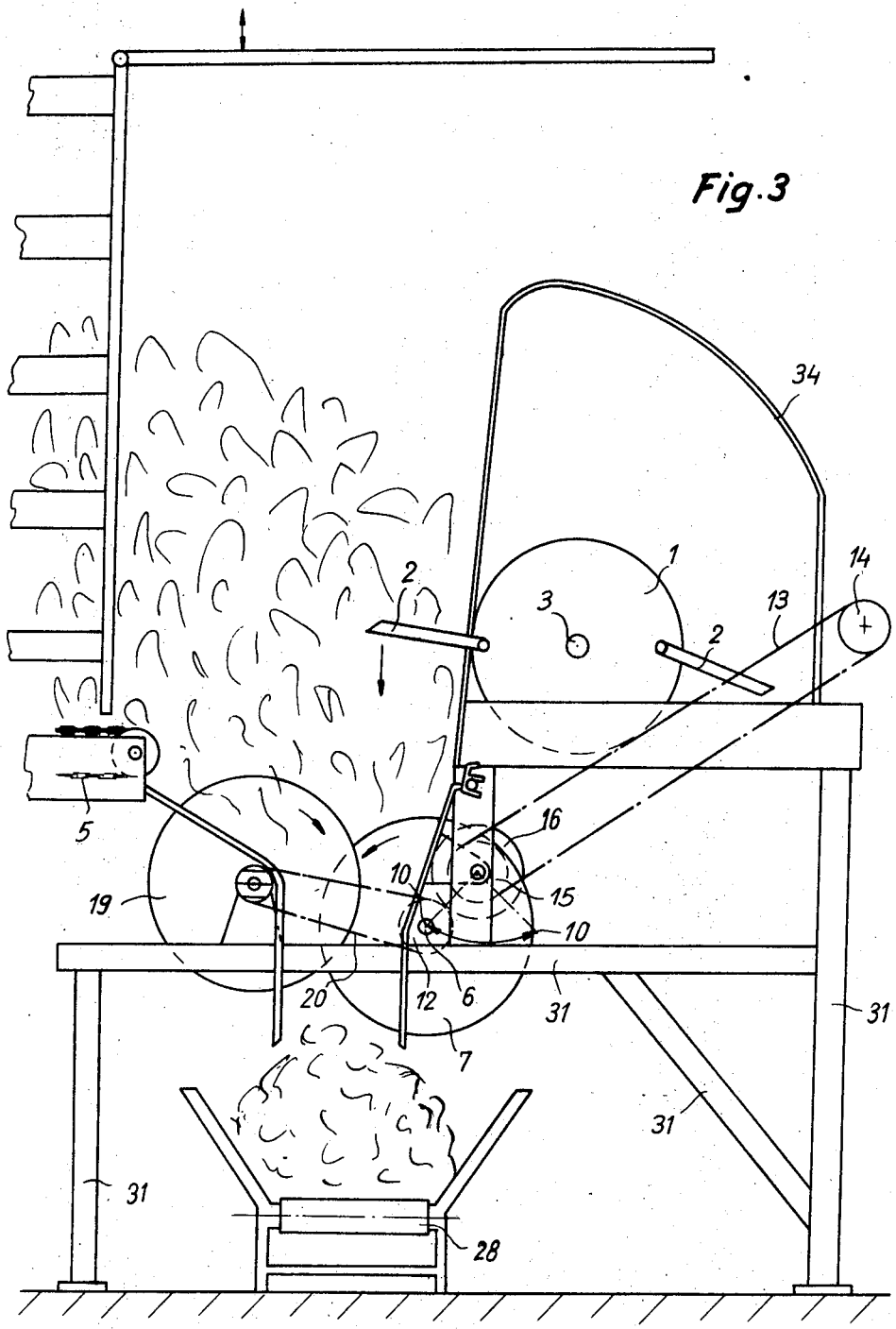
Figure 4:
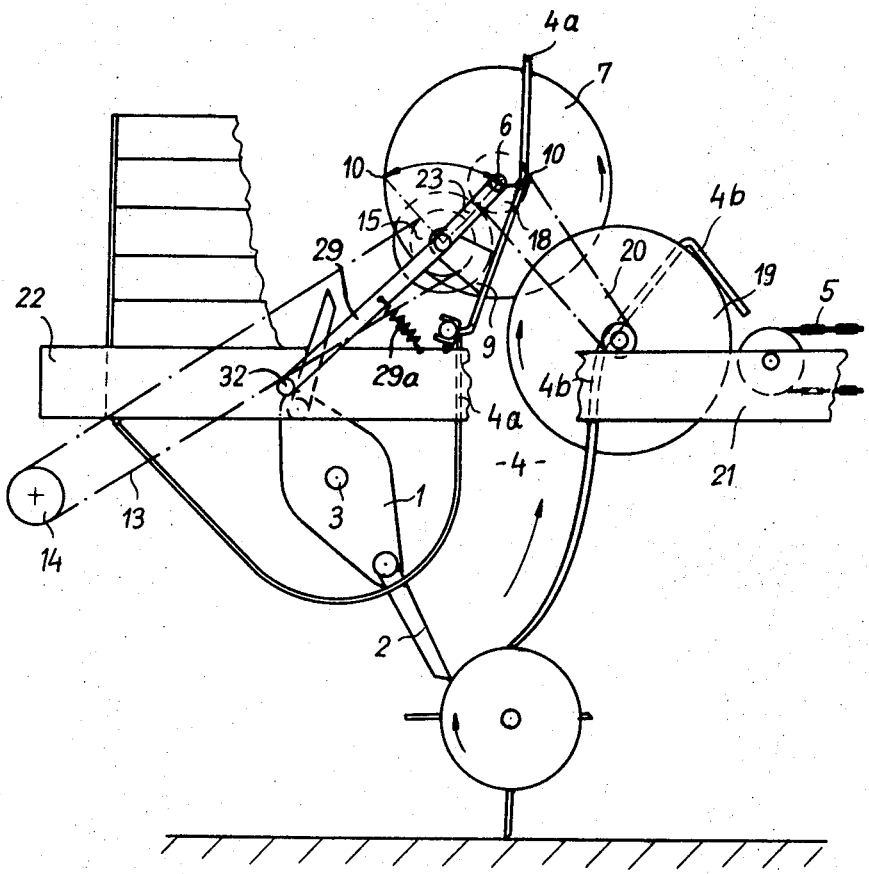

FIG. 1 is a cross-sectional view of one form of cutting device embodying the invention, as installed on a self-loading vehicle, taken along the line X-X of FIG. 2;

FIG. 2 is a plan view of the cutting device shown in section in FIG. 1;

FIG. 2a is a view, similar to FIG. 2, illustrating cutting discs mounted on a shaft for rotation therewith while being axially displaceable along the shaft;

FIG. 3 is a side elevation view of a cutting device embodying the invention and used as a stationarily mounted apparatus;

FIG. 4 is a side elevation view, partly broken away, of another embodiment of the cutting device in accordance with the invention; and FIG. 4a is a view similar to FIG. 4 illustrating a stepping drive for the cutting discs.

DESCRIPTION OF THE PREFERRED EMBODIMENTS

Referring first to FIGS. 1 and 2, a self-loading vehicle is illustrated as including a frame 21 having a crossmember 22 serving as a supporting system for a feed drum 1 carrying conveying prongs 2. Prongs 2 operate in a conveying chute 4 having a front wall 4a and a rear wall 4b. Wall 4a is extended beyond the zone of operation of prongs 2, and the extended portion of wall 4a is formed with slits or openings through which project cutting discs 7 mounted on a shaft 6 arranged on the exterior of wall 4a, so that discs 7 extend into the conveying conduit. Shaft 6 is rotatably supported in bearings 9 carried by the ends of rockers 23 pivotally connected, at pivots 10, to support brackets.

Cutting discs 7 are spaced apart axially on shaft 6 by spacers 8, while being fixed against angular movement or rotation relative to shaft 6. A pinion 12 fixed to shaft 6 meshes with a counter pinion 16 mounted coaxially with a pivot 10, and pinion or gear 16 is secured to rotate with a sprocket 15 driven by main gearing 24 through the medium of a chain 13 and a second sprocket 14.

FIG. 2 illustrates two different arrangements of the cutting discs. Near the ends of shaft 6, the only cutting device is a cutting disc 7a extending as far as the opposite panel or wall 4b of the conduit while, in the central zone of shaft 6, a system is illustrated which can also cope with difficult conditions. In this central zone, each cutting disc is opposite to opposing discs 19, so that a single cutting disc 7b has a portion of its surface projecting into the space between a pair of cutting discs 19. The discs 7b and the discs 19 rotate in mutually opposite angular directions, and this insures accurate cutting even of compressed, bulky and hard material to be conveyed, and even at low angular velocities.

Rear panel or wall 4b of the conduit extends upwardly an appropriate distance, and is bent at its upper end so that its upper edge covers a shaft 18, arranged exteriorly of panel 4b to an extent such that material emerging from feed conduit 4 cannot wind itself around shaft 18. Cutting discs 19 are fixed on shaft 18 and extend into conduit 4 through slits in the extension of panel 4b. Panels 4a and 4b are interconnected by side panels 4c and 4d in such a manner that all the extensions of the panels, including the cutting devices on the driving shafts, form a cohesive structural component or unit which can be mounted as a unit in alignment with the actual conduit aperture in the loading platform and at the level of the loading platform. Thus, the interconnecting elements include longitudinal members 4e which can be affixed, at mounting points 25, by means of rapid closure devices of a known kind. Drum 1 is rotatable about the axis of a shaft 3 mounted in the frame 21 and extending transversely of the frame.

Driving of shaft 18 is effected by a pair of gears 17 connected with a chain drive 20 mounted on shaft 6 and on an intermediate shaft. The upper end of conduit extension 4a carries a flap 4f pivoted thereto and which, before the commencement of operations, is moved into the horizontal position shown in FIG. 1. Its purpose, in loading material comprising very long stalks and extending mainly in the direction of travel before being taken up, is to hold back the first stalks emerging from conduit 4 and passing through the space between the discs, so that these are bent by the following material and, before reaching the zone of action of the cutting edges, are firmly gripped by stalks extending transversely of the discs.

Referring to FIG. 2a, discs 43, cooperable during cutting with discs 7, are mounted to rotate with a shaft 45 while being axially displaceable therealong. For this purpose, the discs 43 are keyed to shaft 45 and shaft 45 is provided with pins 42 engaged by collars 41. Springs 44 between collars 41 and discs 43 bias the discs along shaft 45 to bear against the lateral surfaces of discs 7 on shaft 8. Shaft 45 may be driven in suitably coordinated relation with the remainder of the apparatus through the medium of gearing illustrated generally at 46.

Referring to FIG. 3, an embodiment of the cutting device, as dismounted from a vehicle and arranged on a stationary support surface, is illustrated. In FIG. 3, the device is illustrated as mounted on a stand 31 and, for the sake of simplicity, the panels or walls 4a—4f of the cutting device have been omitted. The apparatus is fed from above, for example, from a loading vehicle, roughly indicated in FIG. 3, which has been backed-up to the apparatus. The cut material falls onto a conveyor belt 28 positioned beneath the apparatus. It will be noted that a guard device 34 is provided for the feed drum 1.

FIG. 4 illustrates an alternative embodiment of the cutting apparatus as built into a loading vehicle. The arrangement of FIG. 4 differs from that of FIGS. 1 and 2 in that the rear cutting discs 19 are accommodated in a free space between wall or panel 4b of chute 4 and a return pulley 5a of the scraper floor 5. Thus, the cutting discs cut the material at the actual upper end of the path of movement of prongs 2 and, in the course of rotation, move the material upwardly a predetermined distance, as indicated by the arrows, and then toward the scraper floor 5.

In this embodiment of the invention, feed drum 1 is in the form of a noncircular curved disc engaged by a roller or runner 32 on a pivoted rod 29 connected to rockers 23. Rod 29 is biased by a spring 29a, connected to frame 21, to maintain runner 32 engaging drum 1 to effect intermittent pivoting movement of the rockers and thus intermittent oscillation of shaft 6 about pivots 10. Thereby, shaft 6 is continuously oscillated in a manner such that cutting discs 7 are alternately pressed to a greater depth into conduit or chute 4 and, in the intervals in between, partially or wholly retracted from the conduit or chute. FIG. 4 illustrates cutting discs 7 in their deepest position in conduit or chute 4, and this position is reached twice during each rotation of conveying drum 1.

In the operation of the arrangement shown in FIG. 4, the material to be conveyed is picked up from the ground by a receiving drum illustrated at the lower portion of the FIG., and moved to the cutting device by prongs 2 on feed drum 1 extending into the conduit through slits in panel or wall 4a. Since, beyond the range of movement or prongs 2, the material can be moved onward only if fresh material is continually following it, the material is first of all pressed together with stalks extending mainly in the transverse direction so that, with each conveying stroke, moved into the zone of the cutting discs or pairs of cutting discs and, in this process, the strand is subdivided several times so that it leaves conduit 4 in the form of several small portions corresponding to the number of cutting discs and their axial spacing.

The small "packets" reach scraper floor 5, or a conveying device, which rapidly removes the material, and without having suffered any appreciable subsequent "matting." The material therefore can be further processed without any difficulty by subsequent machines or by hand. The prepressing or the material, effected solely by the conveying devices, is substantially maintained, which is of advantage ensilaging.

As mentioned, the driving of the device may be made intermittent, so that the maximum power required to drive the cutting device is utilized when the other parts of the device are using their minimum power. The stepping drive illustrated in FIG. 4a effects such an operation. Referring to FIG. 4a, a gear 51 secured to rotate with shafts 3 meshes with a pinion 52 carrying, eccentrically, a pin 53 to which is pivotally connected one end of a link 54. The opposite end of link 54 is pivotally connected to the free end of an arm 55 which is swingably mounted on the shaft carrying the cutting discs 19. Arm 55 carries a pawl 56 which is engageable with the teeth of a ratchet 57 secured to rotate with the shaft carrying discs 19. Reverse rotation of ratchet 57 and of the shaft carrying the discs 19 is prevented by a pawl 58 also engageable with the teeth of ratchet 57. By virtue of the crank mechanism provided by the eccentric pin 53 and the link 54, the discs 19 are turned only when the prongs 2 are drawing the minimum power. At such time, arm 55 is swung clockwise so that pawl 56 engages ratchet 57 to rotate discs 19 clockwise. When arm 55 is swung counterclockwise, pawl 58 prevents counterclockwise motion of discs 19.

While specific embodiments of the invention have been shown and described in detail to illustrate the application of the principles of the invention, it will be understood that the invention may be embodied otherwise without departing from such principles.

I claim:

1. Apparatus for crushing and comminuting stalk or leaf vegetables, including a cutting device, a conveyor feeding material to be comminuted to the cutting device and a chute extending from the conveyor and having walls positioned in the zone of the cutting device, said cutting device comprising, in combination, at least two groups of cutting discs; a respective common shaft mounting the cutting discs of each group for rotation therewith; means rotatably mounting said shafts exteriorly of the walls of said chute, with shafts extending in laterally spaced substantially parallel relation; the cutting discs on the shafts extending through openings in opposite walls of said chute and projecting only partially into said chute; and driving means rotating said shafts at a relatively low speed; the distance between two shafts on opposite sides of said chute being less than the sum of the radii of the opposite cutting discs carried thereby.

2. Apparatus for crushing and comminuting stalk or leaf vegetables, as claimed in claim 1, wherein opposite cutting discs are at least approximately in contact with each other in their zone of overlap.

3. Apparatus for crushing and comminuting stalk or leaf vegetables, as claimed in claim 1, in which said driving means rotates opposite cutting discs in respective opposite angular directions and so that the direction of motion of the opposite cutting discs at the common cutting point is approximately parallel to the direction of transport of material.

4. Apparatus for crushing and comminuting stalk or leaf vegetables, as claimed in claim 1, wherein opposite cutting discs are of respective different diameters.

5. Apparatus for crushing and comminuting stalk or leaf vegetables, as claimed in claim 1, wherein each individual cutting disc of one group is positioned in opposition to a pair of axially closely adjacent cutting discs of the other group so that each individual discs extends between a pair of opposite discs in the zone of overlap.

6. Apparatus for crushing and comminuting stalk or leaf vegetables, as claimed in claim 1, in which said driving means operates on only one group of discs the other group of discs being mounted for free rotation.

7. Apparatus for crushing and comminuting stalk or leaf vegetables, as claimed in claim 1, in which said driving means includes a stepping device operable to drive said cutting discs intermittently.

8. Apparatus for crushing and comminuting stalk or leaf vegetables, as claimed in claim 7, in which said intermittent driving of said cutting discs by said stepping device is coordinated with operation of said conveyor in a manner such that, at any given time, only one of said driving means and said conveyor absorbs maximum power.

9. Apparatus for crushing and comminuting stalk or leaf vegetables, as claimed in claim 1, including pivoted rockers mounting each of said shafts.

10. Apparatus for crushing and comminuting stalk or leaf vegetables, as claimed in claim 9, including a drive reciprocating said rockers whereby said cutting discs are extended further into said chute during those phases of the movement in which less power is required.

11. Apparatus for crushing and comminuting stalk or leaf vegetables, as claimed in claim 9, including spring means biasing said rockers.

12. Apparatus for crushing and comminuting stalk or leaf vegetables, as claimed in claim 1, including a flyback suppressor operatively associated with said shafts to prevent reverse rotation of said cutting discs.

13. Apparatus for crushing and comminuting stalk or leaf vegetables, as claimed in claim 1, including manual operating means operatively associated with at least one of said shafts.

14. Apparatus for crushing and comminuting stalk or leaf vegetables, as claimed in claim 1, in which said shafts and the walls of said chute are constructed as a single unit which can be mounted on a vehicle or can be mounted on a stationary support.

15. Apparatus for crushing and comminuting stalk or leaf vegetables, as claimed in claim 14, in which when said unit is mounted on a loading vehicle having a loading platform, one of said shafts is arranged at the level of the loading platform.

16. Apparatus for crushing and comminuting stalk or leaf vegetables, as claimed in claim 15, in which said driving means drives said shafts to rotate the respective groups of cutting discs at different respective peripheral velocities.

17. Apparatus for crushing and comminuting stalk or leaf vegetables, as claimed in claim 16, in which the peripheral velocity of the cutting discs of one group is a multiple of that of the other.

18. Apparatus for crushing and comminuting stalk or leaf vegetables, as claimed in claim 17, wherein the cutting discs of respective groups have respective different diameters, the peripheral speed of the larger diameter discs being greater than that of the smaller diameter discs.

19. Apparatus for crushing and comminuting stalk or leaf vegetables, as claimed in claim 1, in which said driving means includes a stepping device operable to drive said shafts during a short interval between individual transport strokes of said conveyor.